(12) United States Patent
Mandyam et al.

(10) Patent No.: US 9,313,245 B2
(45) Date of Patent: Apr. 12, 2016

(54) ADAPTIVE STREAMING FOR ON DEMAND WIRELESS SERVICES

(75) Inventors: Giridhar D. Mandyam, San Diego, CA (US); Kevin E. Hunter, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 11/963,891

(22) Filed: Dec. 24, 2007

(65) Prior Publication Data

US 2009/0164653 A1 Jun. 25, 2009

(51) Int. Cl.
*G06F 15/16* (2006.01)
*H04L 29/06* (2006.01)
*H04L 29/08* (2006.01)

(52) U.S. Cl.
CPC .......... *H04L 65/601* (2013.01); *H04L 65/4084* (2013.01); *H04L 65/602* (2013.01); *H04L 67/04* (2013.01); *H04L 67/34* (2013.01)

(58) Field of Classification Search
CPC .................................................. H04L 65/602
USPC ........................................................ 709/231
See application file for complete search history.

(56) References Cited

U.S. PATENT DOCUMENTS

| | | | |
|---|---|---|---|
| 5,488,708 A | | 1/1996 | Hayashi |
| 5,920,701 A | * | 7/1999 | Miller et al. .................. 709/228 |
| 6,959,327 B1 | * | 10/2005 | Vogl et al. ..................... 709/219 |
| 7,065,586 B2 | * | 6/2006 | Ruttenberg et al. ........... 709/244 |
| 7,573,897 B2 | * | 8/2009 | Elmoalem et al. ............ 370/458 |
| 7,693,877 B1 | * | 4/2010 | Zasman ........................ 707/707 |
| 7,792,534 B2 | * | 9/2010 | Wu et al. ..................... 455/452.2 |
| 2002/0049852 A1 | | 4/2002 | Lee et al. |
| 2003/0167472 A1 | * | 9/2003 | Barbanson et al. ........... 725/131 |
| 2004/0024844 A1 | * | 2/2004 | Holmstead .................... 709/219 |

(Continued)

FOREIGN PATENT DOCUMENTS

| | | |
|---|---|---|
| JP | 2002033802 A | 1/2002 |
| JP | 2004013527 A | 1/2004 |

(Continued)

OTHER PUBLICATIONS

Hadjiantonis A M et al, "An Adaptive Service Management Framework for Wireless Networks," IEEE Vehicular Technology Magazine, IEEE, US, vol. 2, No. 3, Sep. 1, 2007, pp. 6-13, XP0141204974, ISSN: 1556-6072.

(Continued)

*Primary Examiner* — Andrew Goldberg
(74) *Attorney, Agent, or Firm* — Fariba Yadegar-Bandari; Campbell C. Chiang

(57) ABSTRACT

An adaptive media distribution system provides an on demand user experience across a limited throughput wireless network by selectively utilizing available storage on a handheld communication device, taking advantage of increased availability of extended memory solutions. Creation of an adaptable user interface (UI) widget (e.g., Trig) serves as a near real-time mechanism for delivery of media content, overcoming the over-the-air latency and difficulties with streaming interoperability. Yet, for handheld communication devices with limited storage, the adaptive media distribution system further allows legacy devices to receive on demand services via streaming, albeit with the requisite relatively long latency associated with cellular multimedia services.

44 Claims, 6 Drawing Sheets

(56) References Cited

U.S. PATENT DOCUMENTS

| | | |
|---|---|---|
| 2004/0098421 A1* | 5/2004 | Peng ............................. 707/203 |
| 2005/0076136 A1* | 4/2005 | Cho et al. ...................... 709/231 |
| 2005/0129042 A1 | 6/2005 | Muhonen et al. |
| 2006/0140119 A1* | 6/2006 | Yeh et al. ...................... 370/235 |
| 2006/0209841 A1* | 9/2006 | Amorello et al. ......... 370/395.21 |
| 2006/0245530 A1* | 11/2006 | Pradhan et al. .............. 375/364 |
| 2006/0271845 A1* | 11/2006 | Butlin et al. .................. 715/513 |
| 2007/0061394 A1* | 3/2007 | Frid-Nielsen et al. ........ 709/202 |
| 2007/0064633 A1* | 3/2007 | Fricke ........................... 370/310 |
| 2007/0083617 A1* | 4/2007 | Chakrabarti et al. ......... 709/218 |
| 2007/0230378 A1* | 10/2007 | Tavares et al. ................ 370/310 |
| 2007/0243860 A1* | 10/2007 | Aiello et al. ................ 455/414.3 |
| 2008/0005318 A1* | 1/2008 | Dong et al. ................... 709/224 |
| 2008/0034126 A1* | 2/2008 | Baker ............................. 710/11 |
| 2008/0076473 A1* | 3/2008 | Yang .............................. 455/557 |
| 2008/0080380 A1* | 4/2008 | Lee et al. ....................... 370/235 |
| 2008/0090553 A1* | 4/2008 | Wan et al. ..................... 455/413 |
| 2008/0139189 A1* | 6/2008 | Hyatt ............................. 455/418 |
| 2008/0195761 A1* | 8/2008 | Jabri et al. .................... 709/250 |
| 2009/0077599 A1* | 3/2009 | Appelquist et al. ............ 725/93 |
| 2009/0106399 A1* | 4/2009 | Shibahara et al. ............ 709/219 |

FOREIGN PATENT DOCUMENTS

| | | |
|---|---|---|
| JP | 2004194070 A | 7/2004 |
| JP | 2007523417 A | 8/2007 |
| KR | 20070018042 A | 2/2007 |
| WO | WO2005081551 | 9/2005 |

OTHER PUBLICATIONS

European Search Report—EP08102954—Search Authority—Munich—Apr. 28, 2009.

European Search Report—EP12154098—Search Authority—Munich—Mar. 22, 2012.

International Search Report and Written Opinion—PCT/US2008/087951—ISA/EPO—Jun. 16, 2009.

\* cited by examiner

ADAPTIVE STREAMING FOR ON DEMAND WIRELESS SERVICES

BACKGROUND

The present aspects generally relate to variable processing of software applications. More particularly, the aspects relate to providing an improved multimedia delivery over a throughput limited cellular communication channel.

Streaming services over cellular access technologies are reaching ubiquity. The popularity of such services demonstrates that end users are willing, at least in the near term, to adapt to limited forms of video content in order to enjoy the mobility of a handheld environment. The limitations imposed by the available throughput and access costs can include low resolution for streaming content and/or long latency periods to buffer at least a portion of the content. Meanwhile, other communication devices with high bandwidth access (e.g., Internet broadband, Wi-Fi, etc.) are increasingly being used to access multimedia content to provide a Video on Demand experience with better resolution and reduced latency.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

An adaptive media delivery system and method provides on-demand media delivery over a reduced bandwidth communication channel by transmitting discrete media files from a network for storage on a mobile device. Thereby, a user may access the media with reduced over-the-air latency as compared to accessing a streaming version of the media. In one aspect wherein the mobile device is too limited in available storage space, the system and method allows reversion to streaming media content.

In one aspect, a method for receiving media content across a limited throughput network accesses and plays a streaming version of a media content selection on a portable communication device in response to the amount of available local data storage being below a threshold. The method further stores a discretely formatted version of the media content selection in the available local data storage in response to the amount of available local data storage exceeding the threshold.

In another aspect, a method for distributing media content across a limited throughput network transmits a discrete media content version across a limited throughput network in response to determining a capacity of a communication device to store the discrete media content version.

In an additional aspect, at least one processor that is configured to receive media content across a limited throughput network has a first module for detecting an amount of available local data storage, a second module for determining a user preference for a media content selection, a third module for accessing and playing a streaming version of the media content selection on a portable communication device in response to the amount of available local data storage being below a threshold, and a fourth module for storing a discretely formatted version of the media content selection in the available local data storage in response to the amount of available local data storage exceeding the threshold.

In yet a further aspect, a computer program product has a computer-readable medium comprising at least one instruction for causing a computer to detect an amount of available local data storage, at least one instruction for causing the computer to determine a user preference for a media content selection, at least one instruction for causing the computer to access and play a streaming version of the media content selection on a portable communication device in response to the amount of available local data storage being below a threshold, and at least one instruction for causing the computer to store a discretely formatted version of the media content selection in the available local data storage in response to the amount of available local data storage exceeding the threshold In yet another aspect, an apparatus is provided with a means for detecting an amount of available local data storage, a means for determining a user preference for a media content selection, a means for accessing and playing a streaming version of the media content selection on a portable communication device in response to the amount of available local data storage being below a threshold, and a means for storing a discretely formatted version of the media content selection in the available local data storage in response to the amount of available local data storage exceeding the threshold In yet an additional aspect, an apparatus for receiving media content across a limited throughput network has an adaptive media application responsive to the presence of removable storage to store discrete media content received from a wireless communication interface on the removable storage for playing by a media player.

In an additional aspect, at least one processor is configured to distribute media content across a limited throughput network by having a first module for determining a selection of media content. A second module obtains a discrete media content version of the selection comprised of a data structure containing an update channel and user interface code. A third module for transmitting the discrete media content version across a limited throughput network in response to determining a capacity of a communication device to store the discrete media content version.

In yet an additional aspect, a computer program product of a computer-readable medium has at least one instruction for causing a computer to determine a selection of media content, at least one instruction for causing the computer to obtain a discrete media content version of the selection comprised of a data structure containing an update channel and user interface code, and at least one instruction for causing the computer to transmit the discrete media content version across a limited throughput network in response to determining a capacity of a communication device to store the discrete media content version.

In another aspect, an apparatus provides a means for determining a selection of media content, for obtaining a discrete media content version of the selection comprised of a data structure containing an update channel and user interface code, and for transmitting the discrete media content version across a limited throughput network in response to determining a capacity of a communication device to store the discrete media content version.

In an additional aspect, an apparatus has a communication interface connected to a limited throughput network. A media distributor is linked to media content for determining a selection of media content. Data storage contains a discrete media content version of the selection comprised of a data structure containing an update channel and a user interface code. A scheduling dispatcher distributes subject to a determined constrain the discrete media content version via the communication interface to a communication device.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

In the following description, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

The apparatus and methods provided are especially well-suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
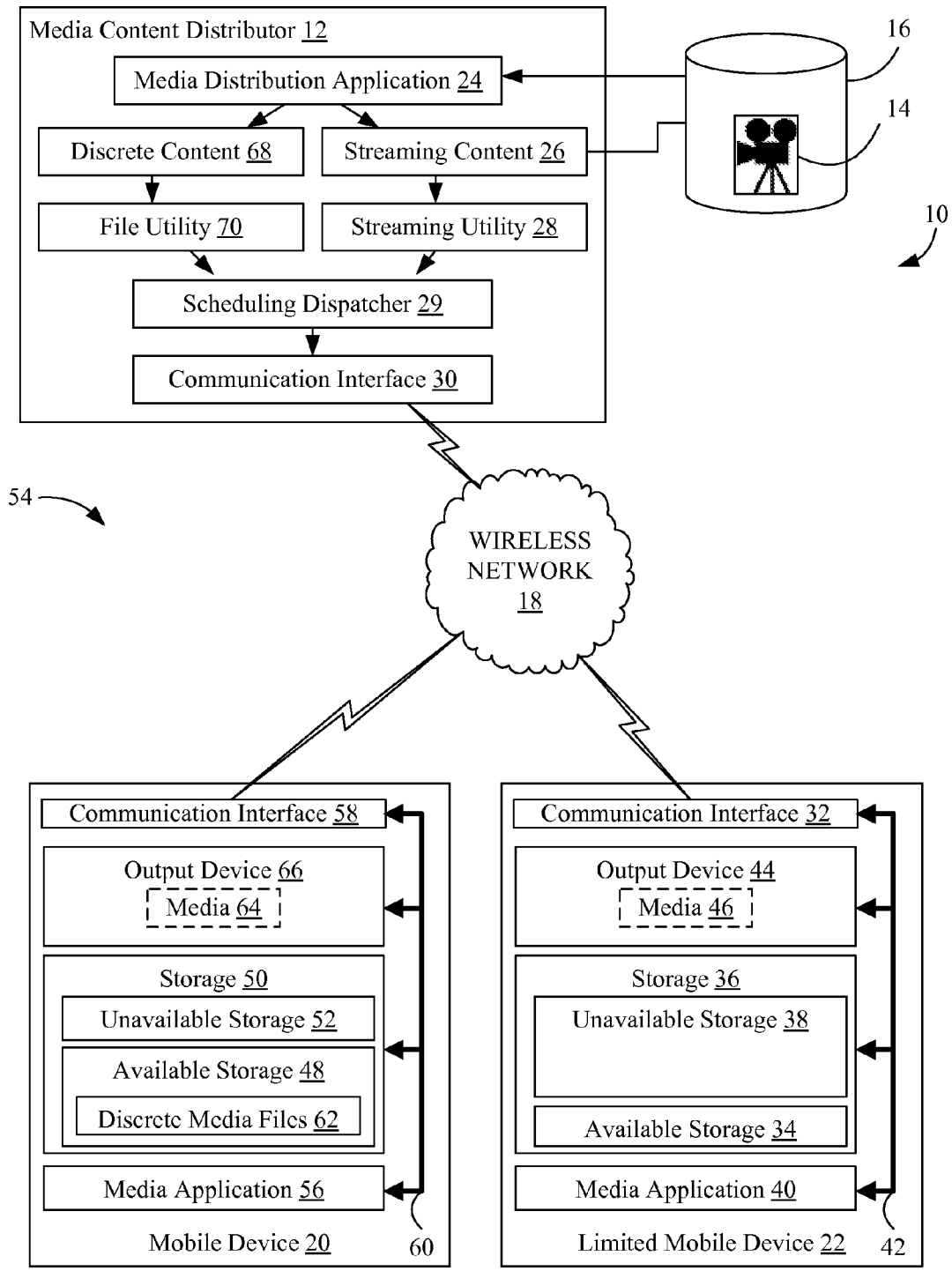
FIG. 1 is a block diagram of a communication system for near real-time media distribution over a wireless network to a storage capable mobile device, according to one aspect.

In FIG. 1, a communication system 10 includes a media content distributor 12 that accesses media content 14 (e.g., video, audio, etc.) stored on a provider source (e.g., database) 16. The communication system 10 further distributes the media content 14 across a communication channel, which in the illustrative version, comprises a wireless network 18, to recipient devices, depicted as a storage capable mobile device 20 and a storage limited mobile device 22.

The wireless network 18 provides a limited data throughput sufficient for near real time media distribution of video on-demand types of communication services. To that end, a media distribution application 24 utilized by the media content distributor 12 may receive the media content 14. The media content 14 is then converted to a video streaming format by a streaming content filter 26, and thereafter buffered or stored in a streaming utility 28. A scheduling dispatcher 29 responds to a request to transmit the media content. A communication interface 30 then transmits a video streaming signal over the wireless network 18 to the requesting storage limited mobile device 22.

A communication interface 32 of the limited mobile device 22 exchanges control signals, as necessary, and receives the streaming content. Internal data storage of the limited mobile device 22 is constrained, as depicted by a relatively small available storage portion 34 of an internal storage device 36 as compared to an unavailable storage portion 38 (e.g., vacant expansion dock, large quantity of stored code or data, limited storage architecture, etc.). Thus, a media application 40 directs the streaming video signal across a data bus 42 to an output device 44 for rendering or playing as a human interpretable media presentation 46 (e.g., visual, audible, haptic, etc.)

In some instances, expanded storage can become available on the same mobile device (e.g., deletion of stored content, insertion of a memory storage device, etc.) or relatively more storage resources are provided by the original equipment manufacturer (OEM). The storage capable mobile device 20 has relatively larger available storage portion 48 of a storage device 50 as compared to an unavailable storage portion 52. Thus, a downstream portion of a near real-time media on-demand system 54 may mitigate the constraints of a limited throughput wireless network 18 to provide more of the experience of video on-demand experiences typical of high bandwidth but short range networks (e.g., Internet Wi-Fi). To that end, a media application 56 may always, or selectively, request and receive from the media content distributor 12 via a communication interface 58 and internal data bus 60 discrete media files 62 that are stored in the storage device 50 for subsequent rendering or playing as a human interpretable media presentation 64 (e.g., visual, audible, and/or haptic, etc.) on an output device 66. The media content distributor 12 comprises an upstream portion of the near real-time media on-demand system 54, depicted as the media distribution application 24 directing media content 14 to a discrete content filter 68 for converting into discrete file format, stored or buffered by a file utility 70 for subsequent distribution by the communication interface 30 over the wireless network 18. The scheduling dispatcher 29 is responsive to constraints for optimally distributing the discrete file format. The near real-time media on-demand system 54 thus avoids streaming by performing background downloads that advantageously avoid the latency in requesting streaming content played on a remote device. Such downloads may also advantageously occur in low demand periods to reduce costs and/or free up transmission throughput for other purposes.

As an exemplary operating environment, media streaming services over third-generation (3G) wireless systems such as High Speed Packet Access (HSPA) and 1×EV-DO (1× Evolution-Data Only, later Evolution-Data Optimized, a.k.a. IS-856 as defined by the International Telecommunication Union (ITU)) come across throughput limitations that can be found in similar services over broadband connections. For one, the quality-of-service (QoS) may not be consistent in long wireless data sessions. In addition, the average delay to stream is affected by the wireless link. As a result, in order to ensure effective playback, receiver buffering may need to increase or user experience suffers. For instance, consider Universal Mobile Telecommunications System (UMTS) release five (5) (i.e., High-Speed Downlink Packet Access (HSDPA)), where data is sent to individual users via a shared physical channel (i.e., High Speed Downlink Shared Channel (HS-DSCH)). As part of this data transfer, a fast automatic repeat request (ARQ) method (a.k.a. hybrid ARQ) is used to ensure data reliability.

It has been shown theoretically that performance can be predicted for HSDPA in the context of hybrid ARQ, determining a delay boundary for the expected amount of time necessary for sending a video file to a handheld device. This delay is affected by errors on the physical link. The two main sources of error are packets that are received incorrectly and missed packets due to misinterpretation of ARQ acknowledgements. Moreover, retransmissions upon detection of an error do not arrive instantaneously. As a result, an "N-phase stop-and-wait hybrid ARQ" mechanism can be used. In this method, several ARQ instances are initiated so that during the acknowledgement turnaround time no gaps in data transmission occur. For instance, if the physical layer frame duration is specified as T, it would take a time period of NT for a retransmission to occur upon detection of a frame error. T is about 2 milliseconds and N is about four (4) in HSDPA.

In the hybrid ARQ method defined for HSDPA, after M transmissions, the transmitted physical layer frame is considered unrecoverable. As a result, the higher layer protocols such as the radio link protocol (RLP) or transport layer protocol (TCP) operate to recover the data. In one instance wherein the initial wireless error rate for which a frame is sent is designated by p, then each successive retransmission results in an approximate reduction error by a factor of C.

The effects of hybrid ARQ are limited by errors in acknowledgements. More specifically, negative acknowledgements (NAKs) that are received in error result in the HSDPA transmitter erroneously designating the associated data frame as having been correctly received. RLP or TCP would be used for error recovery in this case. Assuming the probability of acknowledgement error is f, then the average delay per frame due to hybrid ARQ can be approximated as:

$$D = \sum_{i=1}^{u} (Cp)^{i-1} pNT + (\text{Add}_m)MNT.$$  Eqn. 1 where $\text{Add}_M$ is defined as:

$$\text{Add}_M = \sum_{i=0}^{M-1} fp(Cp)^1(1-f)^1 + p(Cp)^M(1-f)^M.$$  Eqn. 2

If the file size can be defined as F and the rate of transmission in bits per second is R, then the minimum number of physical layer frames necessary to transmit the entire file is:

$$K = \text{ceil}\left[\frac{\frac{F}{R}}{T}\right].$$  Eqn. 3

As a result, the overall lag to transmit this file can be defined as L=DK.

Figure 2:
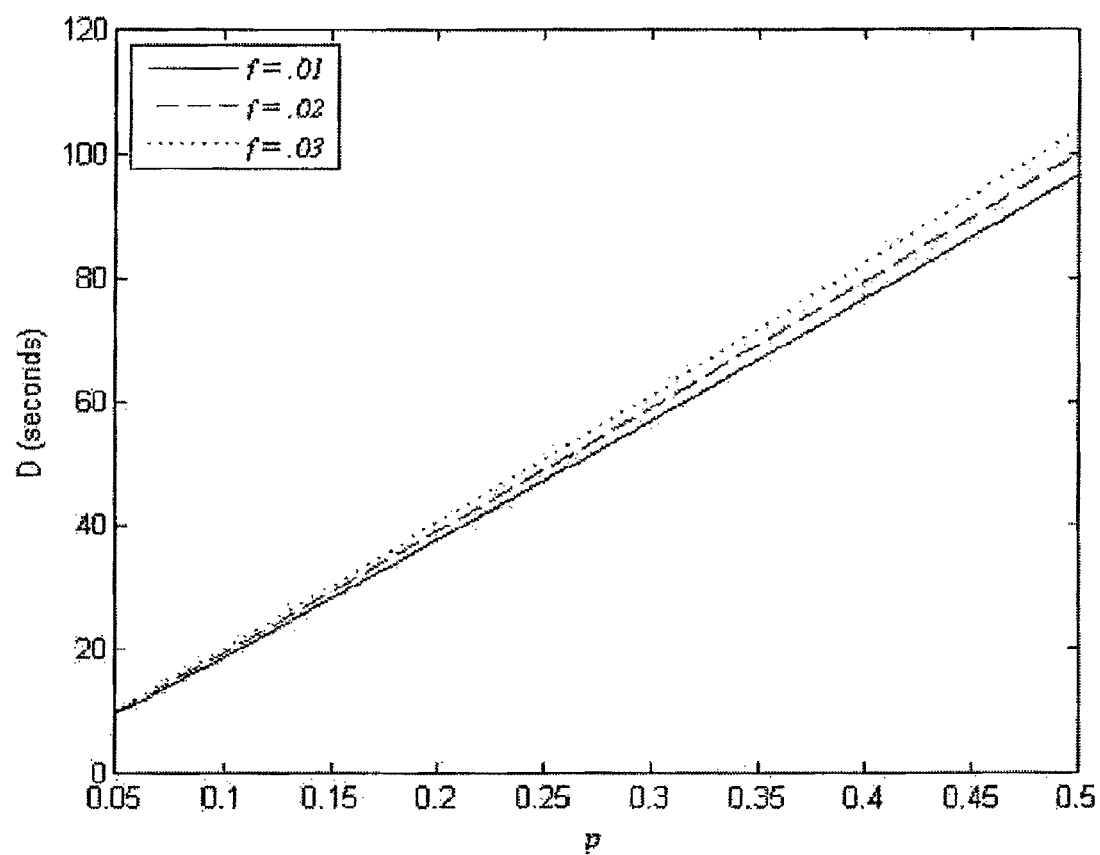
FIG. 2 is a plot of initial wireless error rate p for which a frame is sent versus file transfer lag D for High-Speed Downlink Packet Access (HSDPA), according to another aspect.

As an example, we assume single code HSDPA transmission at 16 Quadrature Amplitude Modulation (QAM) at a forward error correcting code rate of ¾ and a physical layer data rate of 708 kilo bits per second (kbps). In this case, C=0.1. Assuming different values for f while M=4, then the delay with respect to different values of p is depicted in FIG. 2 assuming a video file of approximately four (4) minutes in length encoded at 128 kbps. The aggregate delay approaches one minute for typical values of p (i.e., 0.1 to 0.3). Moreover, 16 QAM, which provides the highest data rates seen in either HSDPA or even 1×-EV-DO, has a limited coverage range and is not typical of the mean throughput seen by end users. It should also be noted that the delay provided in FIG. 2 is a lower bound, as several other limiting factors have not been included, such as additional protocol overhead (e.g., RLP, TCP/IP and streaming protocol headers), turnaround delay due to radio link protocol implementation, and TCP associated delays (e.g., startup, retransmission delay).

This delay effect is readily observable in today's 3G networks, and many users are comfortable with some of the sacrifices made to account for this effect (e.g., reduced video duration, lower quality encoding, etc.). However, this kind of lag begins to approach the point where an On Demand service is not possible. As a result, video streaming, with its considerable delay for source data of several minutes duration or more, will likely not provide a suitable On Demand experience for the end user. Thus, these types of wireless networks are termed herein "sufficient" for near real-time media on-demand services, but fail to provide a satisfactory user experience via over-the-air streaming protocols.

Figure 3:
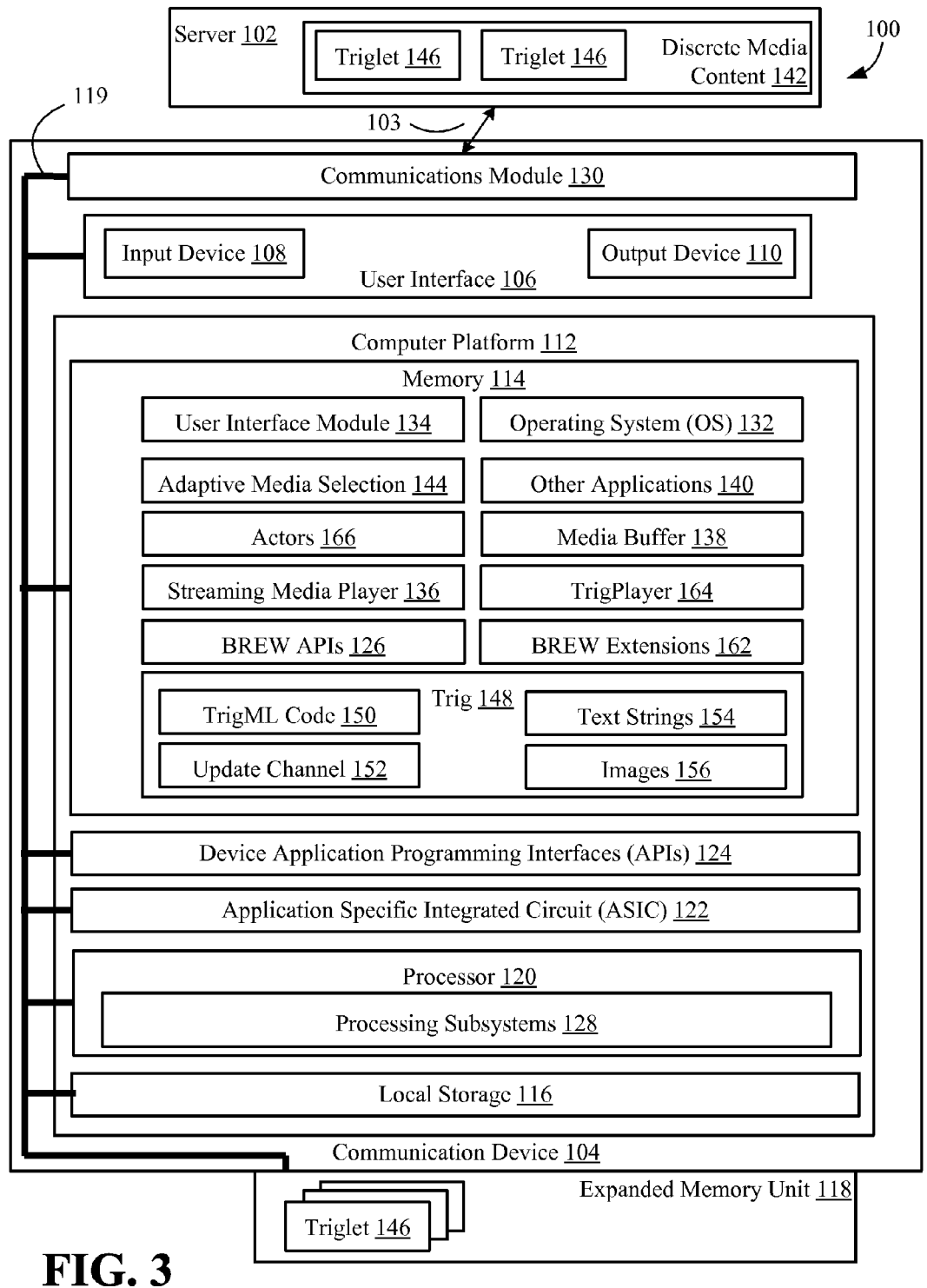
FIG. 3 is a block diagram of an exemplary cellular communication system of the communication system of FIG. 1 for transmitting near real-time media on demand over a third generation wireless network in a manner that addresses the latency issues of video streaming services, according to yet another aspect.

In FIG. 3, an exemplary version of a cellular communication system 100 is depicted as a server 102 wirelessly transmitting near real-time media on demand over a 3G wireless network 103 to a communication device 104 in a manner that addresses the latency issues of video streaming services. According to some aspects, the communication device 104 may comprise any type of computerized, communication device. For example, the communication device 104 may comprise a mobile communication device, such as a wireless and/or cellular telephone. Alternatively, the communication device 104 may comprises a fixed communication device, such as a Proxy Call/Session Control Function (P-CSCF) server, a network device, a server, a computer workstation, etc. It should be understood that communication device 104 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 104 can be a remote-slave or other similar device, such as remote sensors, remote servers, diagnostic tools, data relays, and the like, which does not have an end-user thereof, but which simply communicates data across a wireless or wired network. In alternate aspects, the communication device 104 may be a wired communication device, such as a landline telephone, personal computer, set-top box or the like. Additionally, it should be noted that any combination of any number of communication devices 104 of a single type or a plurality of the afore-mentioned types may be utilized in the cellular communication system 100. Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 104 may include a user interface 106 for purposes such as requesting, interacting with, and/or playing the media content 14. This user interface 106 includes an input device 108 operable to generate or receive a user input into the communication device 104, and an output device 110 operable to generate and/or present information for consumption by the user of the communication device 104. For example, input device 106 may include at least one device such as a keypad and/or keyboard, a mouse, a touch-screen display, a microphone in association with a voice recognition module, etc. In certain aspects, input device 108 may provide for user input of a request for content or for user input of a request for additional information. Further, for example, output device 110 may include a display, an audio speaker, a haptic feedback mechanism, etc. Output device 110 may generate a graphical user interface, a sound, a feeling such as a vibration, etc., and such outputs may be associated, for example, with the presentation of media content 14 (FIG. 1).

Further, communication device 104 may include a computer platform 112 operable to execute applications to provide functionality to the device 104, and which may further interact with input device 108 and output device 110. Computer platform 112 may include a memory, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components. In the illustrative version, memory is depicted as RAM memory 114, a nonvolatile local storage unit 116, and a removable expanded memory unit 118, each connected to a data bus 119 of the computer platform.

Further, computer platform 112 may also include a processor 120, which may be an application-specific integrated circuit (ASIC), or other chipset, processor, logic circuit, or other data processing device. In some aspects, such as when communication device 104 comprises a cellular telephone, processor or other logic such as an application specific integration circuit (ASIC) 122 may execute an application programming interface (API) layers 124 that interfaces with any resident software components, such as voice call, data call, and media-related applications in memory 114. Device APIs 124 may be a runtime environment executing on the respective communication device. One such API 124 runtime environment is Binary Runtime Environment for Wireless® (BREW®) API 126, depicted separately and developed by QUALCOMM Incorporated of San Diego, Calif. Other runtime environments may be utilized that, for example, operate to control the execution of applications on wireless computing devices.

Additionally, processor 120 may include various processing subsystems 128 embodied in hardware, firmware, software, and combinations thereof, that enable the functionality of communication device 104 and the operability of the communication device 104 on communications system 100. For example, processing subsystems 128 allow for initiating and maintaining communications, and exchanging data, with other networked devices as well as within and/or among components of communication device 104. In one aspect, such as in a cellular telephone, processor 120 may include one or a combination of processing subsystems 128, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 128 of processor 120 may include any subsystem components that interact with applications executing on computer platform 112.

Computer platform 112 may further include a communications module 130 that enables communications among the various components of communication device 104, as well as being operable to exchange media content 14 and content requests between the communication device 104 and communications network 103. Communications module 130 may be embodied in hardware, firmware, software, and/or combinations thereof, and may further include all protocols for use in intra-device and inter-device communications. Further, communications module 130 is operable to transmit and/or receive information, such as requesting and receiving media content 14 in accordance with the apparatus and methods described herein.

Certain of these capabilities of the communication device 104 can be facilitated by code loaded from local storage 116, retained in memory 114, and executed by the processor 120, such as an operating system (OS) 132. A user interface module 134 facilitates interactive control with the user interface 130. A streaming media player 136 renders or plays media content on the output device 110, accessing streaming media content contained in a media buffer 138. Other applications 140 may be active in memory 114 for other functions (e.g., communication call control, alarm clock, text messaging, etc.). It should be appreciated with the benefit of the present disclosure that applications consistent with aspects of the present disclosure may omit other applications and/or omit the ability to receive streaming content.

Near real-time media on-demand services are provided by discrete media content 142 remotely stored on the server 102 that is utilized by the communication device 104. In particular, an adaptive media selection module 144 is responsive to the availability of sufficient available data storage in the expanded memory unit 118 to initiate download of the discrete media content 142, depicted as Triglets 146. The media content of the Triglets 146 are used to update Trigs 148 composed of compiled TrigML code 150, an update channel 152, text strings 154, and/or images 156 that are buffered in memory 114. The Trigs 148 are processed by BREW API 126. The BREW APIs 126 provide the ability for applications to call Device APIs 124 and other functions without having to be written specifically for the type of communication device 104. Thus, an application such as the adaptive media selection application 144 may operate identically, or with slight modifications, on a number of different types of hardware configurations within the operating environment provided by BREW API 126, which abstracts certain hardware aspects. A BREW extension 162 can add additional capability to the programming platform of the BREW API 126, such as offering MP3 players, Java Virtual Machines, etc. A Trig Player 164, Trigs 148, and Actors 166 are components of the uiOne™ architecture developed by QUALCOMM Incorporated. These components refer to user interface aspects of the communication device 104. BREW uiOne is a set of BREW extensions that enables rapid development of rich and customizable UIs (i.e., active content, over-the-air (OTA) up-gradable), helps to evolve download business beyond applications, provides theming of part or entire handset UI, and utilizes BREW UI Widgets. Thus, BREW uiOne reduces the time to market for handsets, carrier customization, and consumer personalization. To do this, the BREW uiOne provides a clear set of abstractions, adding two new layers to the application development stack for BREW.

To assist in developing an implementation for the communication system 100, BREW User Interface (UI) utilizes a toolkit (not shown) to facilitate implementation. The Brew UI Toolkit is a model-view-controller (MVC) design pattern. MVC is at the heart of many of today's user interface frameworks, including Java Swing. The MVC pattern breaks graphical UI applications up into three discrete parts: the model, view, and controller. The model is responsible for managing the application-domain data, responding to requests for information about the state of the data (from the view), and changes state (in response to requests from the controller). The view is responsible for managing the graphic output of the application. The controller is responsible for interpreting key events, menu selections, and other inputs, and passing the requests those commands represent to the view (to change its view of the model) or the model (to change its data).

In one implementation, the controller accepts events from the system's event pump, uses polymorphism, or conditional logic to determine the appropriate action to take place within the view or model. In turn, the view listens for change notifications from the model and controller, querying the model for new data as needed when it receives a change notification. The model itself tracks the state of the application data. A common optimization for this pattern is to collapse the responsibilities of the view and the controller into a single programmatic entity; the Brew UI Toolkit uses this, letting an event handler to be specified for any view. In essence, the Brew UI Toolkit provides default controllers for each view, and such behavior can be overridden with a controller via a new event handler.

The Brew UI Toolkit provides base classes that represent the model (IModel) along with several subclasses for specific kinds of models, including a model for text (ITextModel), lists and menus (IListModel and IMenuModel respectively) as well as a general-purpose IValueModel with which you can encapsulate arbitrarily complex structures. The toolkit also provides a horde of user interface primitives from which you can build your user interface, including Widgets for text input, radio and checkbox selection, buttons, text and bitmap display, and menu items and menus. All of these inherit the IWidget interface. Widgets can be nested, and some Widgets perform layout and focus control for the Widgets they contain, giving a decidedly desktop-programming flavor to the process of building a UI. In turn, Widgets occupy a form, which is the top-level of a UI from the perspective of application implementation.

Nesting Widgets can create complex, yet easy-to-use, UIs that are made with the Brew UI Toolkit. As in a desktop GUI, Widgets can contain other Widgets—some Widgets can act as containers, containing other Widgets and controlling their layout. Other Widgets act as decorators, letting you link their functionality to enhance a given Widget. For example, a scrolling text view consists of two Widgets: the text Widget showing the text, and a scrollbar Widget that provides the scrolling behavior, decorating the functionality of the text Widget.

Widgets which contain other Widgets are containers, and implement the IContainer interface. The IContainer interface allows the user manipulate how a Widget performs its job as a container; the IWidget interface allows the user manipulate the Widget itself. Classes like IXYContainer and IConstraintContainer have the primary function of containing objects. To use these objects as Widgets, the corresponding Widget interface is obtained from an instance via ICONSTRAINTCONTAINER_QueryInterface. This requests the Widget interface for the corresponding container object.

While a specific screen consists of a hierarchy of Widgets, an entire application is a collection of forms. A form consists of a top-level container; the Brew UI Toolkit provides a mechanism for an application to track its state as a top-level form (the one currently on-screen) and a stack of forms. As the user use an application, the application uses events like soft keys and selection items to create new forms, fills them with Widgets, and places them on the top of the stack. When the user exits a form (e.g., pressing the clear key), the form is popped from the stack. Just as Widgets and the MVC pattern provide an ability to conceptualize a value and its relationship to the user, forms, and the form stack provide a way to conceptualize application flow within the application. At the highest level, then, the application consists of one or more forms, each of which has a collection of Widgets (the view) which act together on a set of models that represent the state of the application's data. Many Widgets will do their work automatically, enabling the user to enter text or select choices from a menu; others might need additional code in the form of a controller.

Applications can use Widgets without forms, although forms facilitate conceptualization of application flow and groups Widgets. Any application that uses both Widgets and forms creates a root form, a form for each screen, and a top-level container for each form. A top-level form has two responsibilities. First, it maintains the stack of forms and tracks the notion of which form has focus. Second, it presents a container user interface for your form, consisting of a title and soft key labels. By permitting the root form to own the responsibility of creating and configuring these Widgets, device manufacturers can ensure a similar look and feel between all Widget-based applications. The input form is created by the InputForm_Create method, which uses lazy instantiation to create the form and its Widgets.

TrigML® code, owned by QUALCOMM Incorporated, is a data language based on eXtended Markup Language (XML) and may be used for user interface presentation language for authoring Trigs 148 and includes advantages of mobile-targeted functionality, an interactive user interface event model, and pixel positioning among other advantages.

TrigML® is a powerful, lightweight language for UI development utilized by the uiOne Software Developer Kit (SDK) to accommodate the constraints of mobile devices: small screens, low allocation for memory space, and constrained computing power. Even within the parameters of these limitations, the language is remarkably powerful and extensible, so that developers and OEMs can develop graphic- and content-rich UIs much faster with TrigML than with C, the language generally known for UI development. Unlike C, in TrigML, the application logic and the presentation layers are decoupled. This difference represents a strategically important departure from the coding process used in C.

With TrigML, when a developer wants to modify a UI, the presentation layer alone requires customization; there is no need to tamper with the application logic. Conversely, code written in C commingles the presentation layer and the application logic. This monolithic architecture requires dissection of application logic from presentation logic, greatly complicating the editing process. The difficulties imposed by this added step necessitate longer timeframes for UI development, which are in increasingly short supply. In contrast, the intelligent design of the TrigML language creates a huge time savings for the developer and OEM, decreasing the UI development time for each device within a portfolio, and allowing the foundation of many UI designs to be reused, thereby reducing time-to market for portfolios overall.

Returning to FIG. 3, Actors 166 are a particular type of underlying BREW extension 162 that include underlying C code to connect Trigs 148 to underlying Device APIs 124 and/or BREW APIs 126. Actors 166 may also serve as executables for input/output. And because Actors 166 connect to the underlying Device and BREW APIs, 124, 126, Actors 166 have access to functions of the computer platform 112. The Trig Player 164 may be implemented as a BREW Extension 162 even though depicted separately. The Trig Player 164 renders the user interface 130 using the Trigs 148 and Actors 166.

It should be appreciated that the server 102, such as a Universal Directory Service (UDS server), can advantageously facilitate media content delivery by packaging and storing in advance resource-laden user interface (UI) Widgets (e.g., Trigs 148) that contain multimedia resource files. Given that handheld communication devices 104 often have display screens of limited size and limited keypad or other input devices, it is further beneficial that the server 102 create a graphical user interface (GUI) that is intuitive with perhaps a preselected list of suggested media content selections that are bundled with content descriptors and downloaded in advance or upon a user request for rendering/playing content. Either the server 102 and/or the communication device 104 may contain the Actor 166 that handles the transfer, and determines whether the resources are sufficient for storage on the communication device 104. Alternatively or in addition, a Trig 148 may be downloaded in advance to a communication device 104, with only updates as required rather than having to transmit the full Trig 148 again. It should be appreciated with the benefit of the present disclosure that the Trigs 148 may contain advertising content.

Figure 4:
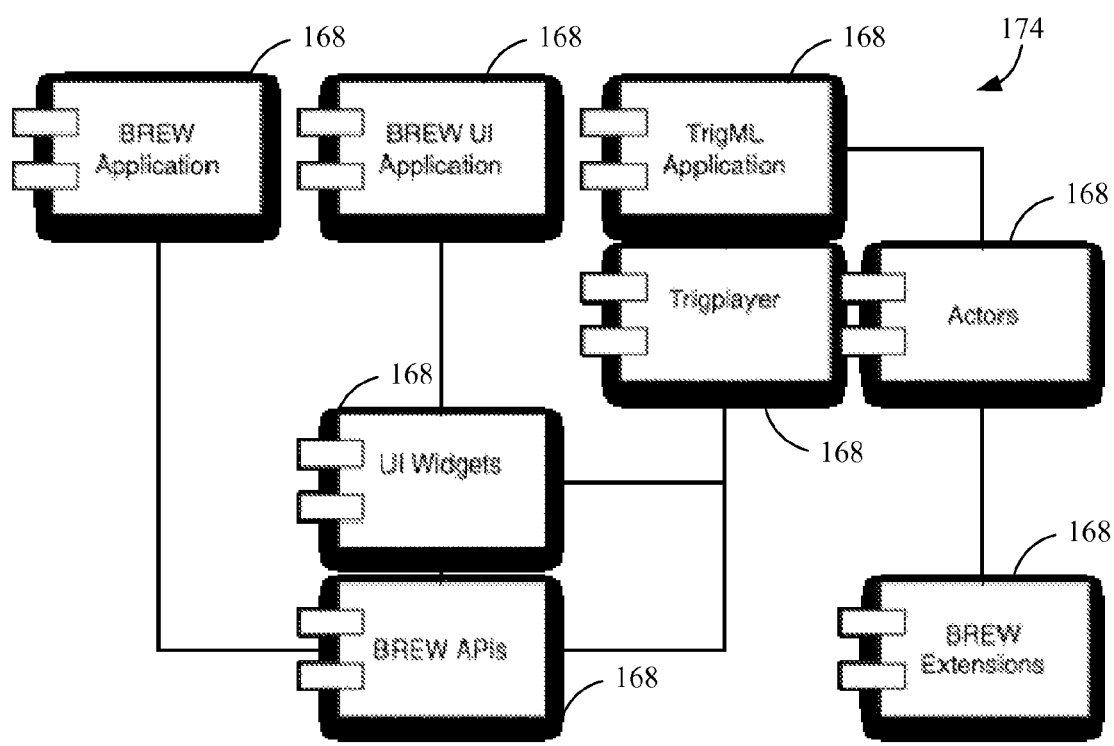
FIG. 4 is diagram of a programming environment for utilizing user interface widgets, Trigs and Actors to communicate media content, according to still another aspect.

In FIG. 4, Trig Player 164 runs on a BREW application 168 as a BREW extension 162 for rendering of interactive UI Trigs 148 and Triglets 146. Trig Builder (not shown) authors TrigML application 170 for Trigs 148. TrigML is a scripting language based on XML used to describe the UI layout, flow, and interactions as BREW UI application 171. BREW UI Widgets (BUIW) 172 provide a framework to quickly develop UI components (Widgets and forms). QUALCOMM uiOne SDK (not shown) facilitates development, simulation and execution of the BREW UI application 171 on a developmental workstation (e.g., personal computer (PC)) (not shown) and contains Trigbuilder and BREW simulator (not shown). Trigs 148 are compiled TrigML code and other resources into application or set of applications. Trig 148 runs on Trig Player 164. A Parcel (not shown) is a file that specifies the source components of a Trig 148 (e.g., text strings 154, images 156, etc.). There are two types of parcels, binary parcel, and XML parcel (not shown). Parcels are source of Trigs 148 & Triglets 146 for any of the following: uiOne static application, single Trig; uiOne dynamic application, multiple Triglets; and uiOneContent campaign, multiple Trigs, multiple Triglets. Parcels contain TrigML, text, images, ringers, wallpapers. Parcel is either a single binary file, which is easy to transfer/forward, or is "exploded" into multiple files with an XML meta-file. Parcel resources include TrigML fragments, images (PNG), text (unicode), lists (composite, for menus, etc.), ringtones, wallpapers, channels, themes (Triglets). Parcel resources are organized into a tree of Trigs and Triglets, with a Trig being usually equivalent to an application and a Triglet usually being a small modification to a Trig, which can be deployed with a TRIG, can be deployed over-the-air (OTA), and can be a theme. Triglets can update any part of a UI 174. Trig inheritance provides that Trigs can derive from other Trigs, Triglets can derive from a Trig, and Triglets can derive from other Triglets. Resources in a derived Trig/Triglet with the same resource path override the parent's resource.

In traditional UI, data supports UI (i.e., data provides theme and resource information to UI application code. But in BREW uiOne, everything is data. Data is the UI 174. Along with theme and resource information, data also provides information on graphics layout, focus movement and other graphical behavior, page map, simple application logic. TrigML mark-up language advantageously makes a data driven UIs rather than other mark up languages like HTML and JavaScript that are not suitable for mobile UIs 174. So a new markup language TrigML was created, retaining some features such as event model of JavaScript, form links of HTML, animation model of SMIL, etc.

Trig Player 166 starts rendering every Trig 148 from the same point, which is a fragment of TrigML called default defined under the /startup/folder. This fragment is automatically created by TrigBuilder when the user creates a new Trig 148. Just like any other mark up language, TrigML uses tags. Few tags are explained below:

<include>—This tag is used to include other fragments in the present fragment.

<layer>—Layers are a fundamental and compulsory part of the TrigML. A minimum UI must contain at least one layer. Layers are invisible full screen containers that are stacked in order they are defined. Each additional layer has memory and performance implications, so it is not a good idea to have large number of layers.

<group>—Group is the basic container element. It can be empty or can contain visible elements referred to as its children. Group element serves two purposes: framing and association and can have dimensions, borders, and back ground colors. If coordinates are not specified, groups and other visible elements will center within their parent boundaries.

<grid>—This tag is like group in that it can contain things, however it has extra features of columns and rows to create cells.

<image>—This tag is used to include image in the Trig.

<tile>—This tag takes a single image and repeats it in different locations. Trig Player 166 provides that enough repetitions are made to cover the entire area specified.

<text>—This tag is used to display static text. Events such as <throw> are used to throw events.

Traditional BREW applications use the BREW APIs 162 directly, or perhaps leverage the BUIW 172 for their user interface, or perhaps interface to user extensions. The uiOne environment adds the notion of Trigs 148, applications written using the TrigML XML vocabulary and played using the Qualcomm-provided Trig Player on the handset. Trigs leverage Actors, the interface between the XML within a Trig and existing or custom extensions to provide functionality left for C and C++, such as the interfaces to a messaging protocol. This architecture permits the development of truly data-driven user interfaces. A BREW Trig-based application (or Triglet) consists of a resource bundle that includes not just an XML definition of the application's interface, but all of the resources required by the application. The Trig Player 166 is not just a browser, and Triglets 146 are not merely the BREW equivalent of an MHTML file. Triglets 146 can interact with Actors 166, which encapsulate the behavior provided by BREW extensions 162, facilitating more complex programmatic behavior.

The Actor interface 166, just like the UI interface 174, is an event-driven one, facilitating Triglets 146 to throw events with named parameters, like this:

```
<throw event="dial" target="/actor/network">
    <param name="number"
    value="+1 888 555 4444"/>
</throw>
```

This code snippet instructs the network Actor to perform its dial event with the named argument number, given the value "+1 888 555 4444," presumably dialing the indicated phone number. In turn, Actors 166 themselves can throw events back to a Triglet 146. For example, an incoming voice call may be caught with a snippet like this:

```
<load when="incomingCall"
    res="popups/incomingCall"
    target="popupLayer"/>
```

Thus, when the incomingCall event arrives, load the incomingCall form into the Triglet's popup layer.

These snippets point to another interesting facet of Triglets 146, built on the Qualcomm BREW resource format (BAR files), the Triglet interface to a bar file's contents is that of a virtual file system. It should be appreciated that BREW uiOne has many applications beyond handset OEMs. One reason is that BREW uiOne simplifies application development for many kinds of applications. Today's applications have huge investments in user interface development in C and C++; although some built entire XML- or HTML-based user interfaces to help ease porting from one handset to another. Others had to continually tailor user interfaces to meet new screen sizes and handset capabilities on a port-by-port basis, or else compromise on the look and feel of our application. BREW uiOne makes a separation of software logic and user interface, placing the user interface in the data segment, permitting far faster iteration during the software development process as you refine your user interface.

TrigML capabilities include a flexible layout model that is easy to learn and predictable. Layering is provided with arbitrary overlap. TrigML defines UI Behavior with built-in event model and integrates with platform APIs 126. TrigML provides for partial page loading, such that links load all or just a part of screen and can be triggered by any event. Template support is made for markup re-use. TrigML is adapted for Mobile UIs, including grids and lists for scrolling menus, tickers for scrolling text and images, and animation effects. TrigML builds on UI Widgets 172.

The <Trig Player> element recursively nest instances of Trig Player 166 with one applet and multiple Trig Player widgets and lives in the parent's hierarchy like any other visible element. Each Trig Player has its own private environment with .TMF file and list of .BAR files, >VFS, /var, update channels, Triglets, persistent store. Thus, benefits for robustness and modularity are provided in that a nested Trig Player has minimal, controlled access to parent. The Trig Player provides a solution for "sandboxing" islands of updatable, possibly third party, content within the user interface 174. Triglets arriving for the nested Trig update only that Trig. BREW® file system path to the nested Trig's TrigMetaFile (.TMF) file specifies the bar files to load into the nested Trig Player, the name used to provide the nested Trig with a unique directory in the BREW.

Figure 5:
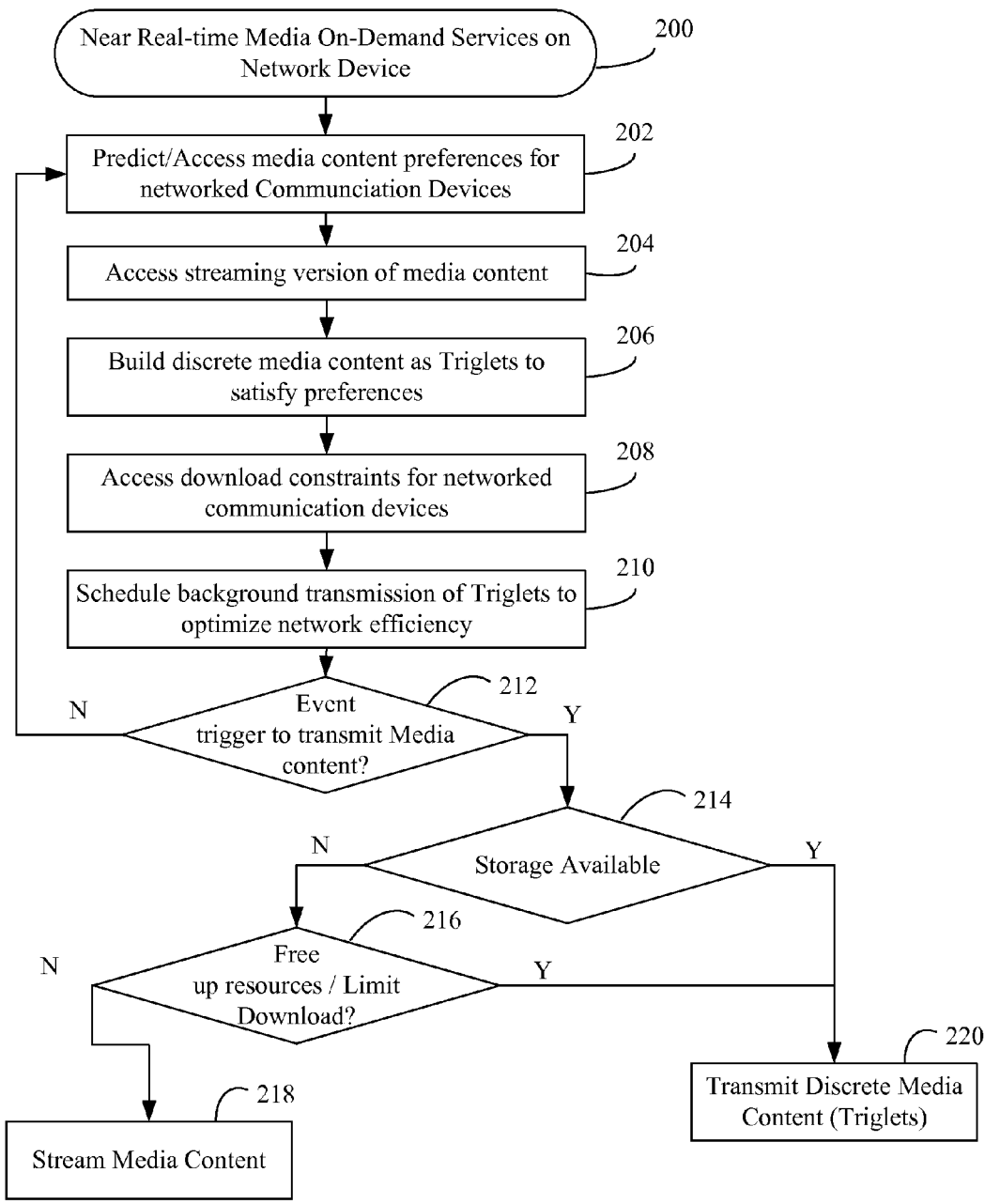
FIG. 5 a flow diagram of a method of distributing media content over a limited throughput communication channel, according to yet another aspect.

In FIG. 5, a method 200 is depicted for distributing media content across a limited throughput wireless network. In block 202, preferences for media content for all, a portion, or individual communication devices is accessed or predicted. An example of a prediction is accessing a list of most popular video downloads for a particular webpage portal. A more individually tailored approach may be express preference settings or comparing a categorization for new media offerings against the categories of media content accessed and played by an individual user of a communication device. The media content is accessed for availability to distribute in block 204, which may comprise streaming media content. In block 206, discrete media content (e.g., Trig, Triglet) is built from the streaming media content in order to enhance the efficiency of media content distribution to communication devices having storage capability. In block 208, distribution may be further enhanced by accessing configuration data for the population of communication devices, determining current or predicted network throughput to the communication devices, or other constraints. Then, in block 210, background scheduling of discrete media content is made as constrained by those devices capable of receiving such content and transmitted at a time at which the network has excess capability to handle the distribution. In block 212, a determination is made as to whether an event trigger has occurred that warrants the transmission of media content. Such scheduling may be dynamically updated, such as prioritizing communication devices that are currently sensed within a portion of the wireless device having excess capability or currently making a high bandwidth communication call that allows downloading to occur in conjunction thereto. Prioritization may be made to communication devices with a history of using near real-time media on-demand services. Alternatively or in addition, the scheduling may utilize a low bandwidth, low cost channel over an extended period in order to achieve the transmission. If no triggering event in block 212, then processing returns to block 202 to continue preparations for such distribution.

In the exemplary version, the network side of the system retains an ability to stream media content to communication devices if unable to store discrete media content. Further, the exemplary version is able to enhance the push of discrete media content by remotely managing the storage of discrete media content on the communication device. For example, downloading one or more abbreviated Triglets can over-write a resource on a nested Triglet or on a host Trig or otherwise command the deletion of expired content to free up additional resources. Alternatively or in addition, the prediction of desired media content could be scaled down to a shorter listing to be supportable within the storage limits known for a particular model of communication device, or as reported by the communication device as its current state. Thus, in block 214, a determination is made as to whether storage is available on the target communication device(s). If not, then a further determination is made as to whether efforts to free up resources/limit download are successful in block 216. If not, then streaming media content (block 218) is performed, albeit with the requisite over-the-air latency inherent in a limited throughput network. If able to make storage available in either block 214 or 216, then discrete media content (e.g., Triglets) is transmitted for distribution to remote communication devices in block 220.

Figure 6:
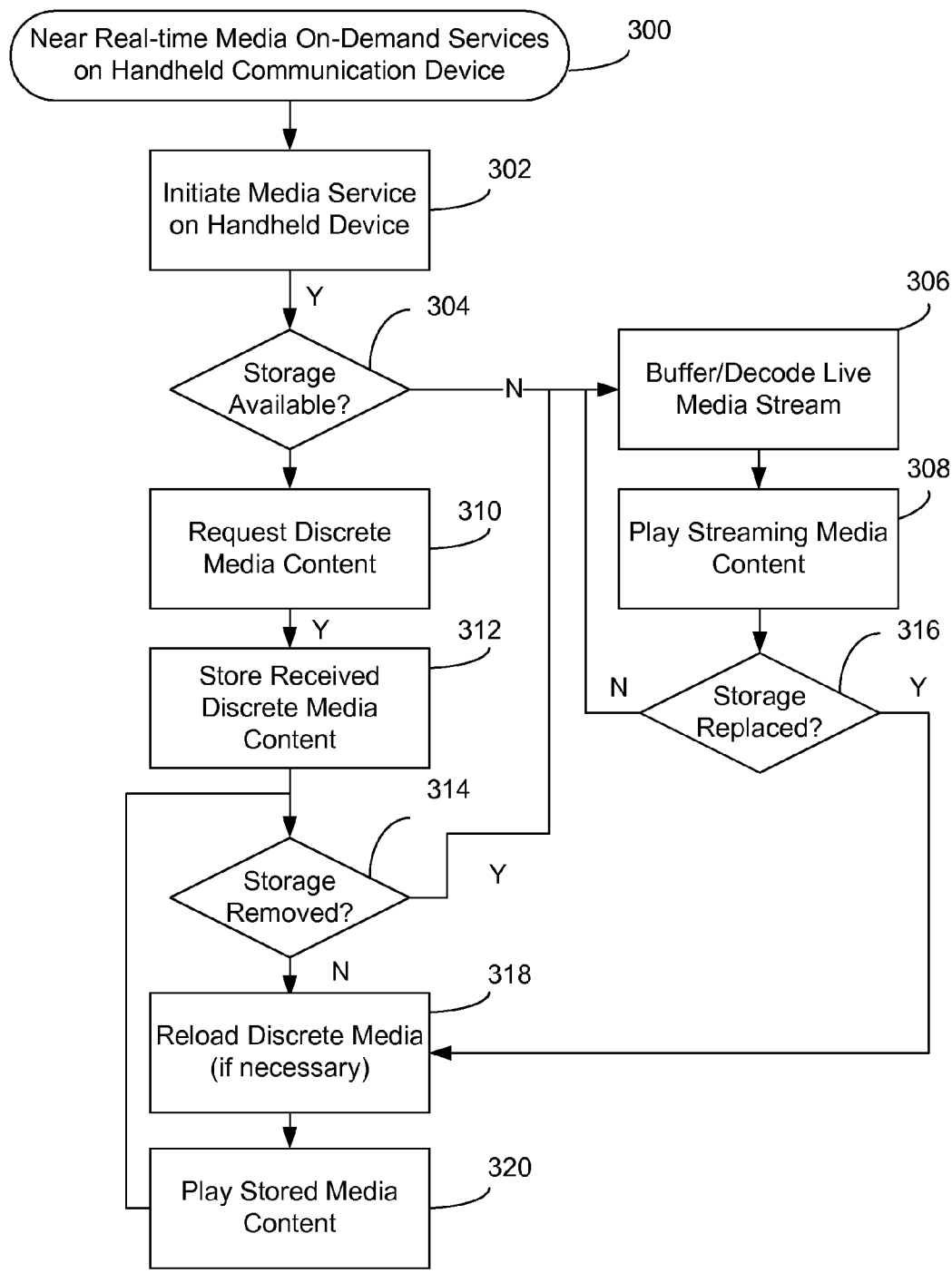
FIG. 6 a flow diagram of a method of receiving media content over a limited throughput communication channel, according to still another aspect.

In FIG. 6, a method 300 is depicted for receiving media content across a limited throughput wireless network. In block 302, media service is initiated on a handheld device. To enhance the media experience, available media content may be summarized in a listing or other graphical user interface (GUI) presentation downloaded in advance, for example with reference to favorites of the end user or as determined by frequency of request by the general audience of end users. The storage availability of the handheld device is determined in block 304. If not sufficient, then media content is selected for streaming delivery and buffered as necessary in block 306. The received streaming media content is then rendered or played in block 308. If in block 304, sufficient memory was determined, then discrete media content (e.g., UI widget, Trig) is requested in block 310 and stored on the handheld device in block 312. To further enhance the user experience, this request for media content delivery may be automated such that preferences are accessed. The content then may be transmitted using excess throughput (e.g., during off-peak hours, during a communication call in which excess bandwidth is available, when a more capable network connection is available, etc.). Monitoring in block 314 determines if storage is no longer available (e.g., a removable memory storage device has been removed; other applications have used the available memory storage, etc.). If memory is not available in block 314, then reversion to streaming media content is made by going to blocks 306 and 308, with checks made in block 316 as to whether storage has become available again. If storage was found to be available in block 314 or block 316, then additional discrete media is reloaded as necessary in block 318 and the stored media content is played in block 320 with iterations made to monitor available storage in block 314.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as at least one instruction or any combination or set of codes and/or instructions on a machine readable medium and/or computer readable medium, which may be incorporated into a computer program product operable to cause a computer to perform the steps and/or actions.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for receiving media content across a limited throughput cellular network, comprising:

monitoring an amount of available local data storage on a wireless communication device to determine whether to stream a media content selection on the wireless communication device or download the media content selection to the available local data storage; and requesting delivery of the media content selection to the wireless communication device via streaming or downloading based on the monitored amount of available local data storage, wherein requesting the delivery of the media content selection to the wireless communication device includes:

streaming, from a remotely located content distributor via the limited throughput cellular network, a streaming version of the media content selection on the wireless communication device if the monitored amount of available local data storage does not meet or exceed a threshold and the local data storage cannot be freed up to store a discretely formatted version of the media content selection, wherein the streaming version and the discretely formatted version have different file formats, the discretely formatted version of the media content selection built at the remotely located content distributor from the streaming version of the media content selection and comprising a file system that contains one or more multimedia resource files, and wherein a delay to stream the streaming version of the media content selection is affected by an over-the-air latency associated with the limited throughput cellular network;

downloading, from the remotely located content distributor via the limited throughput cellular network, and storing the discretely formatted version of the media content selection in the available local data storage if the monitored amount of available local data storage meets or exceeds the threshold or the local data storage can be freed up to store the discretely formatted version of the media content selection, wherein the remotely located content distributor pre-schedules a time at which the discretely formatted version of the media content selection is background downloaded to the wireless communication device and to one or more other communication devices that have available local data storage that meets or exceeds the threshold based on at least a predicted network throughput to the wireless communication device at the pre-scheduled time, and wherein the remotely located content distributor determines the predicted network throughput at the pre-scheduled time based on the limited throughput cellular network having excess bandwidth to handle distributing the discretely formatted version of the media content selection to the wireless communication device and the one or more other communication devices at the pre-scheduled time; and dynamically updating the requested delivery of the media content selection in response to a current iteration of the monitoring detecting a change in state associated with the amount of available local data storage.

2. The method of claim 1, further comprising playing the discretely formatted version of the media content selection stored in the available local data storage on the wireless communication device in response to a request.

3. The method of claim 1, wherein the discretely formatted version of the media content selection comprises a data structure container comprising an update channel, executable user interface code, and the one or more multimedia resource files.

4. The method of claim 1, wherein the discretely formatted version of the media content selection comprises a Trig user interface application.

5. The method of claim 4, wherein the discretely formatted version of the media content selection further comprises a Triglet updating the Trig user interface application.

6. The method of claim 1, wherein the current iteration of the monitoring detects the change in state associated with the amount of available local data storage in response to detecting an expanded memory device inserted into the wireless communication device that has sufficient available data storage to store the discretely formatted version of the media content selection.

7. The method of claim 1, wherein the limited throughput cellular network has a throughput characterized by an over-the-air latency exceeding one fourth of a duration of the media content selection.

8. The method of claim 1, wherein the discretely formatted version of the media content comprises incorporated advertising content.

9. The method of claim 1, wherein dynamically updating the requested delivery of the media content selection includes:

reverting to streaming, via the limited throughput cellular network, the streaming version of the media content selection on the wireless communication device if the change in state detected in the current iteration of the monitoring indicates that the amount of available local data storage no longer meets or exceeds the threshold and that the local data storage cannot be freed up to store the discretely formatted version of the media content selection; and reloading the discretely formatted version of the media content selection for downloading via the limited throughput cellular network and storing in the available local data storage if the change in state detected in the current iteration of the monitoring indicates that the local data storage has become available such that the amount of available local data storage meets or exceeds the threshold or that the local data storage can be freed up to store the discretely formatted version of the media content selection.

10. The method of claim 1, wherein the delay to stream the streaming version of the media content selection is a function of at least a transmission rate and a probable error rate over the limited throughput cellular network.

11. A method for distributing media content across a limited throughput cellular network, comprising:

determining, by a content distributor, a media content selection; and scheduling distribution of the media content selection from the content distributor to a remotely located wireless communication device, wherein scheduling the distribution of the media content selection to the remotely located wireless communication device includes:

streaming, from the content distributor to the remotely located wireless communication device, a streaming version of the media content selection across the limited throughput cellular network in response to determining that a storage capacity of the remotely located wireless communication device is insufficient to store a discrete version of the media content selection, wherein the streaming version and the discrete version have different file formats, the discrete version of the media content selection built at the content distributor from the streaming version of the media content selection and comprising a file system that contains one or more multimedia resource files, and wherein a delay to stream the streaming version of the media content selection is affected by an over-the-air latency associated with the limited throughput cellular network;

transmitting, from the content distributor to the remotely located wireless communication device, the discrete version of the media content selection across the limited throughput cellular network in response to determining that the storage capacity of the remotely located wireless communication device is sufficient to store the discrete version of the media content selection, wherein the content distributor pre-schedules a time at which the discrete version of the media content selection is background transmitted to the remotely located wireless communication device and to one or more other remotely located communication devices that have storage capacity sufficient to store the discrete version of the media content selection based on at least a predicted network throughput to the remotely located wireless communication device at the pre-scheduled time, and wherein the content distributor determines the predicted network throughput at the pre-scheduled time based on the limited throughput cellular network having excess bandwidth to handle distributing the discrete version of the media content selection to the remotely located wireless communication device and the one or more other remotely located communication devices at the pre-scheduled time; and dynamically updating the scheduled distribution of the media content selection in response to a change in state relating to whether the storage capacity of the remotely located wireless communication device is sufficient or insufficient to store the discrete version of the media content selection.

12. The method of claim 11, wherein scheduling the distribution of the media content selection to the remotely located wireless communication device further includes streaming the streaming version of the media content selection in response to the remotely located wireless communication device lacking sufficient capacity to store the discrete version of the media content selection.

13. The method of claim 12, wherein scheduling the distribution of the media content selection to the remotely located wireless communication device further includes transmitting the discrete version of the media content selection in response to freeing resources on the remotely located wireless communication device sufficient to store the discrete version of the media content selection.

14. The method of claim 11, further comprising obtaining a Triglet to update a user interface on the remotely located wireless communication device.

15. The method of claim 11, further comprising scheduling the distribution of the media content selection to the remotely located wireless communication device in accordance with a constraint determined by the content distributor.

16. The method of claim 15, further comprising determining the constraint based upon network availability.

17. The method of claim 15, further comprising determining the constraint based upon usage patterns of the remotely located wireless communication device.

18. The method of claim 11, wherein transmitting the discrete version of the media content selection includes commanding deletion of stored content on the remotely located wireless communication device prior to transmitting the discrete version of the media content selection.

19. The method of claim 11, wherein the content distributor determines the media content selection based on a preference associated with the remotely located wireless communication device.

20. The method of claim 11, further comprising incorporating advertising content into one or more of the streaming version of the media content selection or the discrete version of the media content selection.

21. The method of claim 11, wherein the content distributor utilizes a channel that has a low bandwidth relative to one or more other channels available in the limited throughput cellular network to transmit the discrete version of the media content selection to the remotely located wireless communication device over an extended period.

22. The method of claim 11, wherein the content distributor prioritizes transmitting the discrete version of the media content selection to the remotely located wireless communication device in response to one or more of sensing the remotely located wireless communication device within a portion of the limited throughput cellular network having excess bandwidth or sensing that the remotely located wireless communication device is currently making a high bandwidth call that allows downloading to occur in conjunction thereto.

23. At least one processor to receive media content across a limited throughput cellular network, comprising:

a first module for monitoring an amount of available local data storage on a wireless communication device to determine whether to stream a media content selection on the wireless communication device or download the media content selection to the available local data storage; and a second module for requesting delivery of the media content selection to the wireless communication device via streaming or downloading based on the monitored amount of available local data storage, wherein the second module for requesting the delivery of the media content selection includes:

a third module for streaming, from a remotely located content distributor via the limited throughput cellular network, a streaming version of the media content selection on the wireless communication device if the monitored amount of available local data storage does not meet or exceed a threshold and the local data storage cannot be freed up to store a discretely formatted version of the media content selection, wherein the streaming version and the discretely formatted version have different file formats, the discretely formatted version of the media content selection built at the remotely located content distributor from the streaming version of the media content selection and comprising a file system that contains one or more multimedia resource files, and wherein a delay to stream the streaming version of the media content selection is affected by an over-the-air latency associated with the limited throughput cellular network;

a fourth module for downloading, from the remotely located content distributor via the limited throughput cellular network, and storing the discretely formatted version of the media content selection in the available local data storage if the monitored amount of available local data storage meets or exceeds the threshold or the local data storage can be freed up to store the discretely formatted version of the media content selection, wherein the remotely located content distributor pre-schedules a time at which the discretely formatted version of the media content selection is background downloaded to the wireless communication device and to one or more other communication devices that have available local data storage that meets or exceeds the threshold based on at least a predicted network throughput to the wireless communication device at the pre-scheduled time, and wherein the remotely located content distributor determines the predicted network throughput at the pre-scheduled time based on the limited throughput cellular network having excess bandwidth to handle distributing the discretely formatted version of the media content selection to the wireless communication device and the one or more other communication devices at the pre-scheduled time; and a fifth module for dynamically updating the requested delivery of the media content selection in response to the first module detecting a change in state associated with the amount of available local data storage in a current iteration.

24. A computer program product, comprising:

a non-transitory computer-readable medium comprising one or more instructions, wherein executing the one or more instructions on a processor causes the processor to:

monitor an amount of available local data storage on a wireless communication device to determine whether to stream a media content selection on the wireless communication device or download the media content selection to the available local data storage; and
request delivery of the media content selection to the wireless communication device via streaming or downloading based on the monitored amount of available local data storage, wherein the one or more instructions that cause the processor to request the delivery of the media content selection further cause the processor to:
 stream, from a remotely located content distributor via a limited throughput cellular network, a streaming version of the media content selection on the wireless communication device if the monitored amount of available local data storage does not meet or exceed a threshold and the local data storage cannot be freed up to store a discretely formatted version of the media content selection, wherein the streaming version and the discretely formatted version have different file formats, the discretely formatted version of the media content selection built at the remotely located content distributor from the streaming version of the media content selection and comprising a file system that contains one or more multimedia resource files, and wherein a delay to stream the streaming version of the media content selection is affected by an over-the-air latency associated with the limited throughput cellular network;
 download, from the remotely located content distributor via the limited throughput cellular network, and store the discretely formatted version of the media content selection in the available local data storage if the monitored amount of available local data storage meets or exceeds the threshold or the local data storage can be freed up to store the discretely formatted version of the media content selection, wherein the remotely located content distributor pre-schedules a time at which the discretely formatted version of the media content selection is background downloaded to the wireless communication device and to one or more other communication devices that have available local data storage that meets or exceeds the threshold based on at least a predicted network throughput to the wireless communication device at the pre-scheduled time, and wherein the remotely located content distributor determines the predicted network throughput at the pre-scheduled time based on the limited throughput cellular network having excess bandwidth to handle distributing the discretely formatted version of the media content selection to the wireless communication device and the one or more other communication devices at the pre-scheduled time; and
 dynamically update the requested delivery of the media content selection in response to the one or more instructions that cause the processor to monitor the amount of available local data storage detecting a change in state associated with the amount of available local data storage in a current iteration.

25. An apparatus, comprising:
means for monitoring an amount of available local data storage on a wireless communication device to determine whether to stream a media content selection on the wireless communication device or download the media content selection to the available local data storage; and
means for requesting delivery of the media content selection to the wireless communication device via streaming or downloading based on the monitored amount of available local data storage, wherein the means for requesting the delivery of the media content selection to the wireless communication device includes:
 means for streaming, from a remotely located content distributor via a limited throughput cellular network, a streaming version of the media content selection on the wireless communication device if the monitored amount of available local data storage does not meet or exceed a threshold and the local data storage cannot be freed up to store a discretely formatted version of the media content selection, wherein the streaming version and the discretely formatted version have different file formats, the discretely formatted version of the media content selection built at the remotely located content distributor from the streaming version of the media content selection and comprising a file system that contains one or more multimedia resource files, and wherein a delay to stream the streaming version of the media content selection is affected by an over-the-air latency associated with the limited throughput cellular network;
 means for downloading, from the remotely located content distributor via the limited throughput cellular network, and storing the discretely formatted version of the media content selection in the available local data storage if the monitored amount of available local data storage meets or exceeds the threshold or the local data storage can be freed up to store the discretely formatted version of the media content selection, wherein the remotely located content distributor pre-schedules a time at which the discretely formatted version of the media content selection is background downloaded to the wireless communication device and to one or more other communication devices that have available local data storage that meets or exceeds the threshold based on at least a predicted network throughput to the wireless communication device at the pre-scheduled time, and wherein the remotely located content distributor determines the predicted network throughput at the pre-scheduled time based on the limited throughput cellular network having excess bandwidth to handle distributing the discretely formatted version of the media content selection to the wireless communication device and the one or more other communication devices at the pre-scheduled time; and
 means for dynamically updating the requested delivery of the media content selection in response to the means for monitoring detecting a change in state associated with the amount of available local data storage in a current iteration.

26. An apparatus for receiving media content across a limited throughput cellular network, comprising:
local data storage;
a wireless interface to receive a media content selection;
a media player; and
a controller responsive to an available amount of the local data storage being under a threshold and the controller being unable to free up the local data storage to store a discretely formatted version of the media content selection, to stream, from a remotely located content distributor via the limited throughput cellular network, a streaming version of the media content selection on the media player, wherein the streaming version and the discretely formatted version have different file formats, the discretely formatted version of the media content selection built at the remotely located content distributor from the streaming version of the media content selection and comprising a file system that contains one or more multimedia resource files, and wherein a delay to stream the streaming version of the media content selection is affected by an over-the-air latency associated with the limited throughput cellular network, and responsive to the available amount of the local data storage meeting or exceeding the threshold or the controller being able to free up the local data storage to store the discretely formatted version of the media content selection, to download, from the remotely located content distributor via the limited throughput cellular network, and store, in the local data storage, the discretely formatted version of the media content selection, wherein the remotely located content distributor pre-schedules a time at which the discretely formatted version of the media content selection is background downloaded to the apparatus and to one or more other communication devices that have available local data storage that meets or exceeds the threshold based on at least a predicted network throughput to the apparatus at the pre-scheduled time, and wherein the remotely located content distributor determines the predicted network throughput at the pre-scheduled time based on the limited throughput cellular network having excess bandwidth to handle distributing the discretely formatted version of the media content selection to the apparatus and the one or more other communication devices at the pre-scheduled time, and responsive to a change in state associated with the available amount of the local data storage, to dynamically request that the remotely located content distributor subsequently deliver the media content selection via streaming or downloading based on the change in state.

27. The apparatus of claim 26, wherein the local data storage comprises a removable memory device.

28. The apparatus of claim 26, wherein the media player comprises a Trig player and the discretely formatted version of the media content selection comprises one or more of a Trig user interface application or a Triglet updating a Trig user interface application previously stored in the local data storage.

29. The apparatus of claim 26, wherein the discretely formatted version of the media content selection comprises a data structure container comprising an update channel, executable user interface code, and the one or more multimedia resource files.

30. The apparatus of claim 26, wherein the limited throughput cellular network has a throughput characterized by an over-the-air latency exceeding one fourth of a duration of the media content selection.

31. At least one processor to distribute media content across a limited throughput cellular network, comprising:
 a first module for determining a media content selection; and
 a second module for scheduling distribution of the media content selection to a remotely located wireless communication device, wherein the second module for scheduling the distribution of the media content selection to the remotely located wireless communication device includes:
  a third module for streaming a streaming version of the media content selection across the limited throughput cellular network to the remotely located wireless communication device in response to determining that a storage capacity of the remotely located wireless communication device is insufficient to store a discrete version of the media content selection, wherein the streaming version and the discrete version have different file formats, the discrete version of the media content selection built at a content distributor from the streaming version of the media content selection and comprising a file system that contains one or more multimedia resource files, and wherein a delay to stream the streaming version of the media content selection is affected by an over-the-air latency associated with the limited throughput cellular network;
  a fourth module for transmitting the discrete version of the media content selection across the limited throughput cellular network to the remotely located wireless communication device in response to determining that the storage capacity of the remotely located wireless communication device is sufficient to store the discrete version of the media content selection, wherein the content distributor pre-schedules a time at which the discrete version of the media content selection is background transmitted to the remotely located wireless communication device and to one or more other remotely located communication devices that have storage capacity sufficient to store the discrete version of the media content selection based on at least a predicted network throughput to the remotely located wireless communication device at the pre-scheduled time, and wherein the content distributor determines the predicted network throughput at the pre-scheduled time based on the limited throughput cellular network having excess bandwidth to handle distributing the discrete version of the media content selection to the remotely located wireless communication device and the one or more other remotely located communication devices at the pre-scheduled time; and
  a fifth module for dynamically updating the scheduled distribution of the media content selection in response to a change in state relating to whether the storage capacity of the remotely located wireless communication device is sufficient or insufficient to store the discrete version of the media content selection.

32. A computer program product, comprising:
 a non-transitory computer-readable medium comprising one or more instructions, wherein executing the one or more instructions on a processor causes the processor to:
  determine a media content selection; and
  schedule distribution of the media content selection to a remotely located wireless communication device, wherein the one or more instructions that cause the processor to schedule the distribution of the media content selection further cause the processor to:
   stream, to the remotely located wireless communication device, a streaming version of the media content selection across a limited throughput cellular network in response to a storage capacity of the remotely located wireless communication device being insufficient to store a discrete version of the media content selection, wherein the streaming version and the discrete version have different file formats, the discrete version of the media content selection built at a content distributor from the streaming version of the media content selection and comprising a file system that contains one or more multimedia resource files, and wherein a delay to stream the streaming version of the media content selection is affected by an over-the-air latency associated with the limited throughput cellular network;

transmit, to the remotely located wireless communication device, the discrete version of the media content selection across the limited throughput cellular network in response to the storage capacity of the remotely located wireless communication device being sufficient to store the discrete version of the media content selection, wherein the content distributor pre-schedules a time at which the discrete version of the media content selection is background transmitted to the remotely located wireless communication device and to one or more other remotely located communication devices that have storage capacity sufficient to store the discrete version of the media content selection based on at least a predicted network throughput to the remotely located wireless communication device at the pre-scheduled time, and wherein the content distributor determines the predicted network throughput at the pre-scheduled time based on the limited throughput cellular network having excess bandwidth to handle distributing the discrete version of the media content selection to the remotely located wireless communication device and the one or more other remotely located communication devices at the pre-scheduled time; and dynamically update the scheduled distribution of the media content selection in response to a change in state relating to whether the storage capacity of the remotely located wireless communication device is sufficient or insufficient to store the discrete version of the media content selection.

33. An apparatus, comprising:

means for determining a media content selection; and means for scheduling distribution of the media content selection to a remotely located wireless communication device, wherein the means for scheduling the distribution of the media content selection includes:

means for streaming, to the remotely located wireless communication device, a streaming version of the media content selection across a limited throughput cellular network in response to a storage capacity of the remotely located wireless communication device being insufficient to store a discrete version of the media content selection, wherein the streaming version and the discrete version have different file formats, the discrete version of the media content selection built at a content distributor from the streaming version of the media content selection and comprising a file system that contains one or more multimedia resource files, and wherein a delay to stream the streaming version of the media content selection is affected by an over-the-air latency associated with the limited throughput cellular network;

means for transmitting, to the remotely located wireless communication device, the discrete version of the media content selection across the limited throughput cellular network in response to the storage capacity of the remotely located wireless communication device being sufficient to store the discrete version of the media content selection, wherein the content distributor pre-schedules a time at which the discrete version of the media content selection is background transmitted to the remotely located wireless communication device and to one or more other remotely located communication devices that have storage capacity sufficient to store the discrete version of the media content selection based on at least a predicted network throughput to the remotely located wireless communication device at the pre-scheduled time, and wherein the content distributor determines the predicted network throughput at the pre-scheduled time based on the limited throughput cellular network having excess bandwidth to handle distributing the discrete version of the media content selection to the remotely located wireless communication device and the one or more other remotely located communication devices at the pre-scheduled time; and means for dynamically updating the scheduled distribution of the media content selection in response to a change in state relating to whether the storage capacity of the remotely located wireless communication device is sufficient or insufficient to store the discrete version of the media content selection.

34. An apparatus for distributing media content across a limited throughput cellular network, comprising:

a processor to determine a media content selection;

network storage to store a streaming version of the media content selection and a discrete version of the media content selection, wherein the streaming version and the discrete version have different file formats, the discrete version of the media content selection built at a content distributor from the streaming version of the media content selection and comprising a file system that contains one or more multimedia resource files, and wherein a delay to stream the streaming version of the media content selection is affected by an over-the-air latency associated with the limited throughput cellular network;

a scheduling dispatcher to schedule distribution of the media content selection to a remotely located wireless communication device based on a storage capacity of the remotely located wireless communication device; and a transmitter to stream the streaming version of the media content selection to the remotely located wireless communication device across the limited throughput cellular network in response to the scheduling dispatcher determining that the storage capacity of the remotely located wireless communication device is insufficient to store the discrete version of the media content selection, wherein the content distributor pre-schedules a time at which the discrete version of the media content selection is background transmitted to the remotely located wireless communication device and to one or more other remotely located communication devices that have storage capacity sufficient to store the discrete version of the media content selection across the limited throughput cellular network based on at least a predicted network throughput to the remotely located communication device at the pre-scheduled time, and wherein the content distributor determines the pre-scheduled time and the predicted network throughput at the pre-scheduled time in response to the scheduling dispatcher determining that the storage capacity of the remotely located wireless communication device is sufficient to store the discrete version of the media content selection and based on the limited throughput cellular network having excess bandwidth to handle distributing the discrete version of the media content selection to the remotely located wireless communication device and the one or more other remotely located communication devices at the pre-scheduled time, wherein the scheduling dispatcher is further to dynamically update the scheduled distribution of the media content selection in response to a change in state relating to whether the storage capacity of the remotely located wireless communication device is sufficient or insufficient to store the discrete version of the media content selection.

35. The apparatus of claim 34, wherein the transmitter is to stream the streaming version of the media content selection in response to the scheduling dispatcher further determining that the remotely located wireless communication device lacks sufficient capacity to store the discrete version of the media content selection.

36. The apparatus of claim 34, wherein the processor is further to obtain a Triglet to update a user interface on the remotely located wireless communication device.

37. The apparatus of claim 34, wherein the scheduling dispatcher is further to schedule the distribution of the media content selection to the remotely located wireless communication device in accordance with a constraint.

38. The apparatus of claim 37, wherein the scheduling dispatcher is to determine the constraint based upon network availability.

39. The apparatus of claim 37, wherein the scheduling dispatcher is to determine the constraint based upon usage patterns of the remotely located wireless communication device.

40. The apparatus of claim 34, wherein the transmitter is further to command deletion of stored content on the remotely located wireless communication device prior to transmitting the discrete version of the media content selection to the remotely located wireless communication device.

41. The apparatus of claim 34, wherein the processor is to determine the media content selection based on a preference associated with the remotely located wireless communication device.

42. The apparatus of claim 34, wherein the processor is further to incorporate advertising content into one or more of the streaming version of the media content selection or the discrete version of the media content selection.

43. A method for receiving a media content selection over a cellular network, comprising:
monitoring local data storage available on a mobile device to determine whether to stream the media content selection on the mobile device or download the media content selection to the local data storage on the mobile device;
streaming, from a remotely located content distributor via the cellular network, a streaming version of the media content selection on the mobile device in response to a first iteration of the monitoring determining that the available local data storage does not meet or exceed a threshold and that the local data storage cannot be freed up to store a discrete version of the media content selection, wherein a delay to stream the streaming version of the media content selection is affected by an over-the-air latency associated with the cellular network;
dynamically updating a schedule to download the discrete version of the media content selection to the local data storage on the mobile device in response to a second iteration of the monitoring determining that the available local data storage meets or exceeds the threshold or that the local data storage can be freed up to store the discrete version of the media content selection, wherein the streaming version and the discrete version have different file formats, the discrete version of the media content selection built at the remotely located content distributor from the streaming version of the media content selection and comprising a file system that contains one or more multimedia resource files; and
downloading, from the remotely located content distributor via the cellular network, the discrete version of the media content selection to the available local data storage on the mobile device in accordance with the schedule dynamically updated in the second iteration of the monitoring, wherein the remotely located content distributor pre-schedules a time at which the discrete version of the media content selection is background downloaded to the mobile device and to one or more other communication devices that have available local data storage that meets or exceeds the threshold based on at least a predicted network throughput to the mobile device at the pre-scheduled time, and wherein the remotely located content distributor determines the predicted network throughput at the pre-scheduled time based on the cellular network having excess bandwidth to handle distributing the discrete version of the media content selection to the mobile device and the one or more other communication devices at the pre-scheduled time.

44. A method for receiving a media content selection over a cellular network, comprising:
monitoring local data storage available on a mobile device to determine whether to stream the media content selection on the mobile device or download the media content selection to the local data storage on the mobile device;
determining a schedule to download a discrete version of the media content selection to the local data storage on the mobile device in response to a first iteration of the monitoring determining that the available local data storage meets or exceeds a threshold or that the local data storage can be freed up to store the discrete version of media content selection;
downloading, from a remotely located content distributor via the cellular network, the discrete version of the media content selection to the available local data storage on the mobile device in accordance with the schedule determined in the first iteration of the monitoring, wherein the remotely located content distributor pre-schedules a time at which the discrete version of the media content selection is background downloaded to the mobile device and to one or more other communication devices that have available local data storage that meets or exceeds the threshold based on at least a predicted network throughput to the mobile device at the pre-scheduled time, and wherein the remotely located content distributor determines the predicted network throughput at the pre-scheduled time based on the cellular network having excess bandwidth to handle distributing the discrete version of the media content selection to the mobile device and the one or more other communication devices at the pre-scheduled time; and
dynamically reverting to streaming, from the remotely located content distributor via the cellular network, a streaming version of the media content selection on the mobile device in response to a second iteration of the monitoring determining that the available local data storage no longer meets or exceeds the threshold and that the local data storage cannot be freed up to store the discrete version of the media content selection, wherein the streaming version and the discrete version have different file formats, the discrete version of the media content selection built at the remotely located content distributor from the streaming version of the media content selection and comprising a file system that contains one or more multimedia resource files, and wherein a delay to stream the streaming version of the media content selection is affected by an over-the-air latency associated with the cellular network.

* * * * *